US011329590B2

(12) United States Patent
Pullen et al.

(10) Patent No.: US 11,329,590 B2
(45) Date of Patent: May 10, 2022

(54) CURRENT-SOURCED MOTOR DRIVE CONTROL FOR AC MOTORS

(71) Applicant: Astronics Advanced Electronic Systems Corp., Kirkland, WA (US)

(72) Inventors: Timothy M. Pullen, Carnation, WA (US); John Fayia Bangura, Waxhaw, NC (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 0 days.

(21) Appl. No.: 16/701,608

(22) Filed: Dec. 3, 2019

(65) Prior Publication Data

US 2020/0177120 A1     Jun. 4, 2020

Related U.S. Application Data

(60) Provisional application No. 62/774,932, filed on Dec. 4, 2018.

(51) Int. Cl.
*H02P 27/06* (2006.01)
*H02P 27/04* (2016.01)
*H02P 23/14* (2006.01)

(52) U.S. Cl.
CPC ............ *H02P 27/06* (2013.01); *H02P 23/14* (2013.01); *H02P 27/047* (2013.01)

(58) Field of Classification Search
CPC ............ H01R 13/516; H01R 13/6581; H01R 13/6273; H01R 13/631
See application file for complete search history.

(56) References Cited

U.S. PATENT DOCUMENTS

| | | | | | |
|---|---|---|---|---|---|
| 4,013,937 | A | * | 3/1977 | Pelly | H02J 3/1835 363/10 |
| 4,446,414 | A | * | 5/1984 | Tupper | H02P 25/024 318/723 |
| 4,467,262 | A | * | 8/1984 | Curtiss | H02P 27/10 318/807 |
| 5,296,796 | A | * | 3/1994 | Glower | H02P 6/08 318/808 |
| 5,504,667 | A | * | 4/1996 | Tanaka | H02M 5/4505 363/37 |
| 5,572,099 | A | * | 11/1996 | Carobolante | H02P 23/186 318/400.17 |
| 5,869,946 | A | * | 2/1999 | Carobolante | H02P 6/10 318/811 |
| 6,252,362 | B1 | * | 6/2001 | White | H02P 6/10 318/400.2 |

(Continued)

OTHER PUBLICATIONS

Patent Cooperation Treaty; PCT/US2019/064449; International Search Report; dated Feb. 5, 2020.

*Primary Examiner* — Rina I Duda
(74) *Attorney, Agent, or Firm* — Wiggin and Dana LLP; Jonathan Harris; Brian A. Pattengale

(57) ABSTRACT

A current sourced control topology is provided for an AC motor controller that eliminates many of the problems associated with prior art motor controllers that use voltage source inverter (VSI) technologies. By controlling the output of AC current sources such as synchronously controlled down converters to directly drive each motor phase, significant efficiency gains and a reduction in electromagnetic interference is achievable.

17 Claims, 8 Drawing Sheets

(56) References Cited

U.S. PATENT DOCUMENTS

| | | | |
|---|---|---|---|
| 7,136,342 B2 * | 11/2006 | Gushima | G11B 7/0062 |
| | | | 369/59.12 |
| 7,821,145 B2 | 10/2010 | Huang et al. | |
| 8,912,792 B2 | 12/2014 | Seeley et al. | |
| 2009/0134734 A1 | 5/2009 | Nashiki | |
| 2013/0187473 A1 * | 7/2013 | Deboy | H02M 7/49 |
| | | | 307/82 |

* cited by examiner

CURRENT-SOURCED MOTOR DRIVE CONTROL FOR AC MOTORS

RELATED APPLICATIONS

This application claims priority to provisional application Ser. No. 62/774,932, which was filed Dec. 4, 2018, and whose entire contents are incorporated herein by reference.

FIELD OF THE DISCLOSURE

This disclosure relates to a novel control concept for controlling AC induction motors, that relies on current sourced control rather than traditional voltage sourced control.

BACKGROUND OF THE DISCLOSURE

For many decades, AC motors have served all industries and they continue to be the backbone of many industrial applications worldwide. In many cases, such as direct AC voltage applications, these motors are directly connected to a three-phase AC voltage source that meets the unique motor rating. For both variable speed and specific control applications, three phase Voltage Source Inverters (VSIs) with a DC link voltage capable of resolving the line-to-line voltages are used to control AC induction motors.

The VSI controls an AC induction motor by regulating both voltage and frequency. This is a standard prior art approach with volts per hertz (V/F) and Field Orientated Control schemes. Motor control using a VSI is achieved by sinusoidal modulation of the pole voltage per-phase that is based on the incremental integral volt-seconds with the line or motor phase inductance and produces pseudo-sinusoidal motor currents.

This approach has a very long history and is well established. However, the complexity of providing a high DC link voltage and in performing inverter phase-leg modulation results in a motor control solution that has many drawbacks. These drawbacks include a bulky form factor that requires large and expensive DC bus capacitors and that has excessive weight, power and high frequency losses, high electromagnetic interference (EMI) losses and electromagnetic compatibility (EMC) issues, high stress on motor insulation, as well as bearing currents.

Although this disclosure describes particular embodiments for controlling an asynchronous AC motor (i.e., an induction motor), workers of ordinary skill in the art will recognize that the solutions provided herein are equally applicable to the control of both synchronous and asynchronous AC motors, in that they eliminate the foregoing drawbacks of VSI control and power stage modulation by using directly coupled current sources to control the AC motor, without the need to rely on the rated AC voltage. Accordingly, the teachings disclosed herein can be applied to many AC motor applications, and are particularly suited for cooling fan motors that are required to operate in environments that demand very low EMI.

By way of further background, in the prior art, AC motors, either synchronous or asynchronous, have generally been controlled by applying pulse width modulation (PWM) techniques to the output of a voltage source inverter (VSI). This prior art approach frequently requires a high DC link voltage between the rectifier and inverter sections of the VSI.

As one example, for many aerospace and other industrial applications, AC motors may be directly coupled to both single and three phase sinusoidal voltages such as AC generator feeds, or to the output of a carrier rejection filter when using PWM to generate a sinusoidal output current from a VSI. In all such cases, AC motors are typically subjected to high DC link voltages in order to create the sinusoidal current required for each phase.

During operation of a three-phase or multi-phase asynchronous motor (e.g., an induction motor) or synchronous motor (e.g., a permanent magnet AC (PMAC) motor), per-phase sinusoidal currents flow within the stator coils are separated in phase from each other (e.g., by 120° for a three-phase motor) and create a rotating magnetic field. In turn, this rotating magnetic field, or AC flux swing, cuts through the rotor windings and induces voltages in the rotor windings. These induced voltages create their own magnetic field due to current flowing in the shorted rotor windings. In response, the rotor magnetic field will attempt to align with the rotating stator magnetic field. Similarly, in the case of a PM motor, the rotor magnets will attempt to align with the rotating stator magnetic field.

In both cases, these interactions cause a torque to be generated on the rotor that causes it to start rotating. In order for the rotor of an asynchronous induction motor to remain energized in motor mode (i.e., producing torque), the rotational speed of the motor is always less than the synchronous speed of the stator excitation frequency. The difference between these speeds is known as the slip frequency in motor mode of operation.

As mentioned, pulse-width modulated (PWM) drives or power controllers are typically used to drive and control asynchronous and synchronous AC motors over a wide range of speeds and load operating conditions. In the case of traditional power controllers that employ VSIs, the DC source voltage must be sized so that the inverter AC output line-line voltage is less than the DC source voltage. The modulation strategy, be it space vector, third harmonic, or sine, will determine the maximum DC voltage utilization ratio.

With PWM-controlled drives, the motor current per-phase 12 (see, FIG. 1) will depend on the motor, the line inductance and the 'on-time' of the sinusoidal modulation cycle. This current is also referred to as the "integral volt-seconds". In the case of sinusoidal modulation, the 'on-time' is a function of the transfer function below and the comparative relationship between the sine function and a trapezoidal ramp carrier signal. In particular, the high and low pulse on-time or pole voltage duration may be defined as follows.

$$v_F = v_t \sin(\omega t) \Rightarrow \begin{matrix} t_{high} = \frac{t_c}{2}\left(1 + \frac{v_m}{\hat{v}_c}\right) \\ t_{low} = \frac{t_c}{2}\left(1 - \frac{v_m}{\hat{v}_c}\right) \end{matrix} \rightarrow m_a = \frac{\hat{u}_{ref}}{\hat{u}_\Lambda}$$

where the period of the triangle waveform (carrier) is $t_c$, $v_m$ is the magnitude of the modulating signal, $\hat{v}_c$ is the peak positive magnitude of the carrier signal, and the term $m_a$ is the modulation index. The incremental current seen by the motor is given by the following relationship:

$$V_L = L_\phi \frac{di_L}{dt_{on}} \rightarrow \left[i_L \phi = \frac{1}{L_\phi}\int_0^{t_h} \tilde{v}_L dt + i(0)\right]\Big|_{t_h = t_1 \ldots t_{max}}$$

For such a control scheme to be effective, the AC motor is rated at a unique voltage so that the time integral of voltage (volt-seconds) (see, reference numeral 12 of FIG. 1), ensures a full-cycle sinusoidal current swing that meets the AC motor requirements. In this regard, it should be noted that all AC motors are current-controlled devices.

Overall, prior art voltage source inverters work well, but at the penalty of requiring high DC link source voltages. They also have the aforementioned drawbacks and design challenges and long-term reliability concerns. These concerns include power stage switching losses and high stress on motor insulation, high frequency losses, bearing currents, possible shoot-through that causes reliability concerns, EMI noise and the need to reject the pole voltage swing using output sinusoidal filters when working with long-line motor and controller systems.

Moreover, during motor or generator mode operation of an asynchronous or synchronous motor, a rotational back EMF voltage is induced in the armature of the stator and/or rotor due to the rotation of the rotor and the currents injected into its multi-phase windings.

At zero speed and during an initial start condition, the AC motor will draw a much higher phase current due to the absence of this back EMF, and the AC motor temporarily sees the full source voltage at start. However, once the AC motor is rotating, the increased back EMF has the effect of reducing the voltage seen by the motor (due to effects of simultaneous motor and generator action), thereby reducing the motor phase current to its normal rated value.

In order to continue normal operation and establish electrical equilibrium wherein the back EMF has a constant average value, the control system must draw down on the line-potential in order to overcome the effects of the back EMF. This process of source potential degradation due to generation of the back EMF requires the input of considerable energy from the source in the form of a voltage in order to maintain normal operation.

The biggest hurdle with prior art motor drives, including 3-phase voltage source inverter (VSI) topologies in particular, is the need for a large DC link voltage. Typically, AC induction motors are voltage fed, using either a sinusoidal voltage, or a modulated switch node pole voltage, so that the current is a factor of the integral volt-seconds over a sinusoidal modulation window. Creating these large DC link voltages is a challenge in itself, and particularly so when many motors require DC link voltages of several hundred volts and higher, in order to create the current needed for a unique torque requirement.

In this regard, the aerospace industry is currently considering the use higher voltages in the range of 540VDC to 805VDC in order to drive lower phase currents, since this would result in lighter transmission cables. This trend towards higher DC voltages makes the use of correspondingly high DC link voltages for motor control even more challenging.

A second challenge to prior art VSI systems is in the use of switch-node pole voltage modulation, where the pole node of the inverter swings, either from ground to full DC link voltage, as in the case of a 2-level modulation scheme, or at a reduced voltage level, as in the case of multi-level configurations. Either way, this complicates the design from a modulation control perspective, with EMI and electromagnetic compatibility (EMC) being a major consideration. Very large voltage swings with rise times of 100-300 ns almost certainly lead to common-mode noise emissions, along with the potential for radiated emissions due to switch node modulation, intrinsic inductances within the VSI, parasitic capacitive elements and cabling, etc.

BRIEF SUMMARY OF THE DISCLOSURE

In order to overcome and mitigate the deficiencies noted above with prior art motor controls that use voltage source inverters, this disclosure presents a solution to the control of AC motors, both synchronous and asynchronous, that eliminates the VSI and PWM modulation approach and uses directly coupled current sources to provide current control to an AC motor.

BRIEF DESCRIPTION OF DRAWINGS

The features and advantages of this disclosure will be more fully understood with reference to the following, more detailed description, when taken in conjunction with the accompanying figures, wherein.

DETAILED DESCRIPTION

Figure 1:
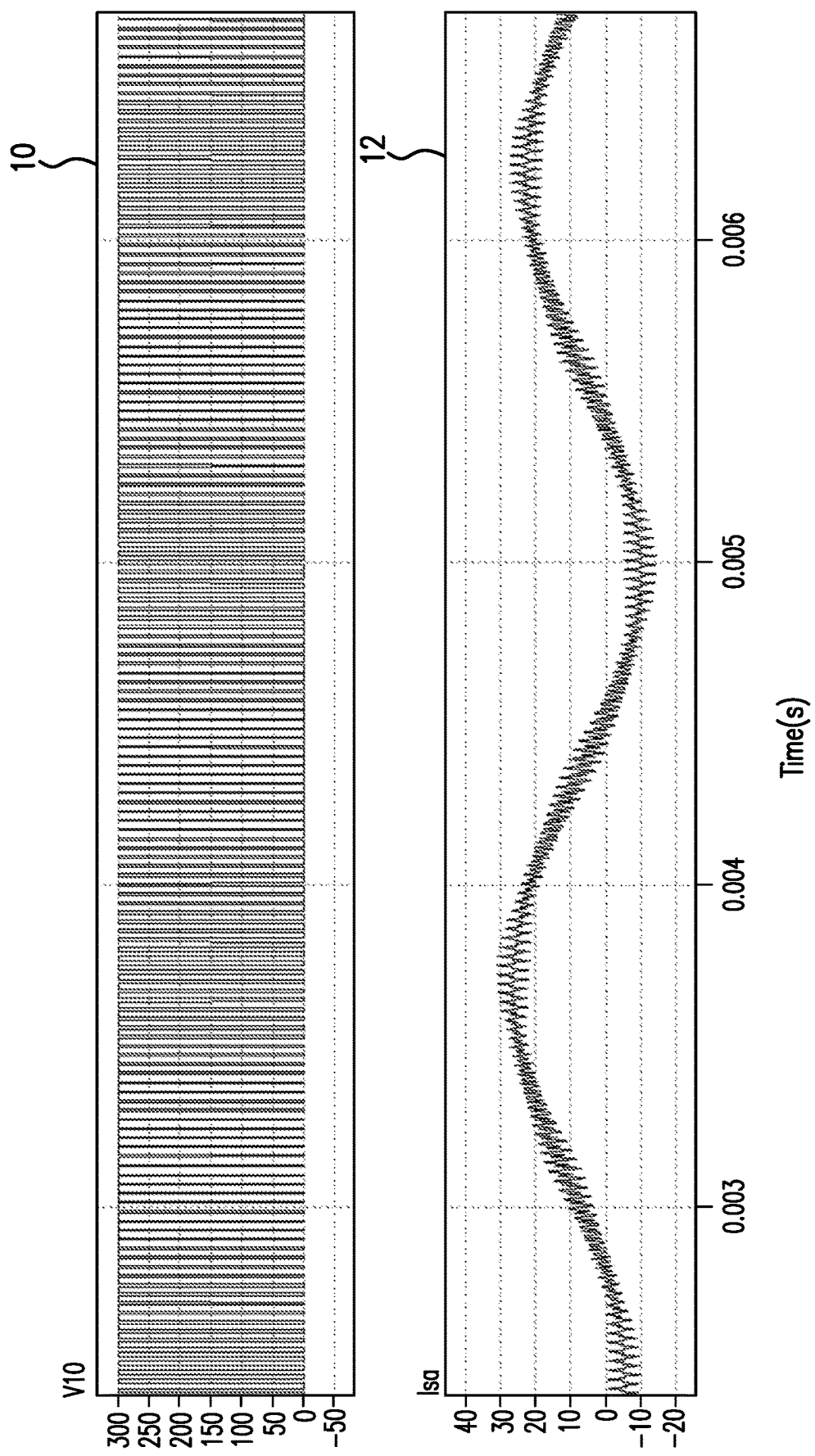
FIG. 1 illustratively depicts an exemplary square wave pole voltage modulation waveform 10 in the upper chart, with the resulting integral volt-seconds 12 (current) shown in the lower chart, as typically used in the prior art.

As mentioned above, one of the challenges in designing aerospace equipment is to minimize electromagnetic interference (EMI). Prior art motor controllers based on voltage source inverter (VSI) technology use pulse width modulation (PWM) techniques to switch the DC link voltage with a sine modulation scheme. As a consequence, and as shown at reference numeral 12 in FIG. 1, the integral volt-seconds of the motor inductance (or in-line sine filter), creates a pseudo-sinusoidal current with ripple terms.

Although this is the standard by which substantially all prior art VSI motor controllers operate, PWM, among other drawbacks, creates technical challenges for reducing EMI. This is particularly the case when sensitive equipment demands the highest immunity to EMI such as RF systems. Under these circumstances, cooling fan motors, for example, can be a major source of EMI.

In all cases, a multi-phase motor requires AC currents injected into its windings to create a rotating magnetic field. From a conventional operating perspective, the motor current is the difference between the AC source voltage and the back EMF voltage, divided by the motor impedance. As discussed above, in accordance with conventional prior art methods, the AC currents are provided by using a fixed AC voltage, or by generating AC voltages from a voltage source inverter having a high DC link voltage, and using PWM techniques to provide sinusoidal currents. In motor mode of operation, the source voltage always has to be greater than the back EMF (BEMF) voltage.

In accordance with this disclosure, circuit topologies are described by which the requisite sinusoidal currents are directly injected into each phase of the multiphase stator windings, without PWM switching of a high DC link voltage.

This may be achieved using current sources that have sufficient voltage necessary to source the current, particularly at motor startup where the current needs to be sized to overcome the impedance of the winding. Such current source topology is able to operate without the need for a high DC voltage, e.g., whereby sinusoidal PWM forces the integral volt-seconds per phase to create sinusoidal AC current.

In accordance with this disclosure, the current source is not limited to any particular type. For example, in one embodiment, the current source in accordance with this disclosure may be a current sourced synchronous down converter, otherwise known in the art as a Buck Converter.

Figure 3:
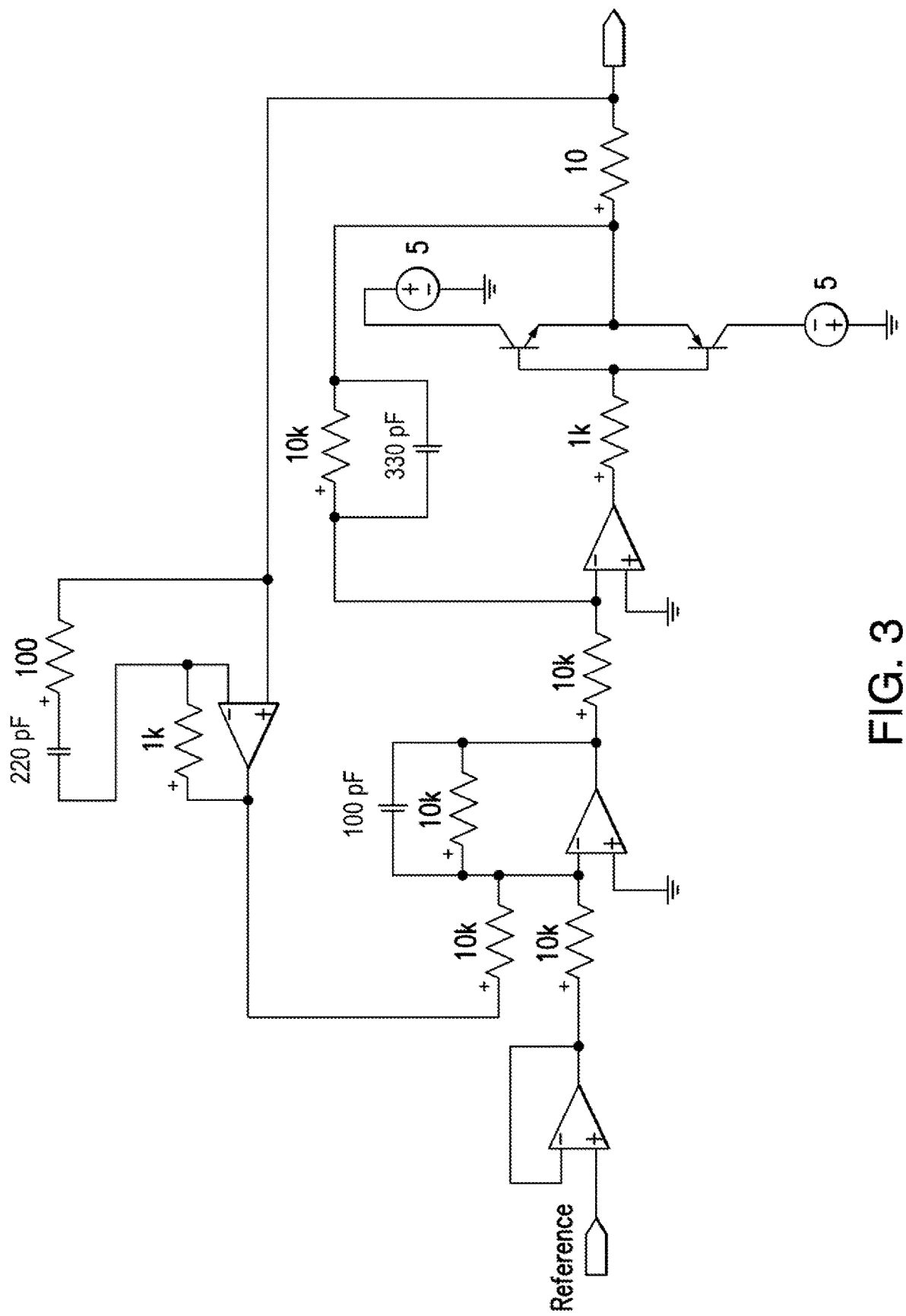
FIG. 3 illustrates a circuit for an exemplary current amplifier that may be used as a linear current source in accordance with the disclosure.

While a Buck Converter offers a high efficiency approach, many other current source topologies may be used, including, by way of another example, a linear current amplifier, e.g. as shown in FIG. 3. The selection of a particular current source may depend on the type of application and motor current requirement.

In accordance with this disclosure, each phase of the multi-phase current source is provided with a variable amplitude and frequency sinusoidal voltage reference that represents both the amplitude and frequency of the current that is to be supplied to each phase of the multi-phase motor. For control purposes, one of these phases is designated as a master phase reference, as discussed further herein.

Figure 2:
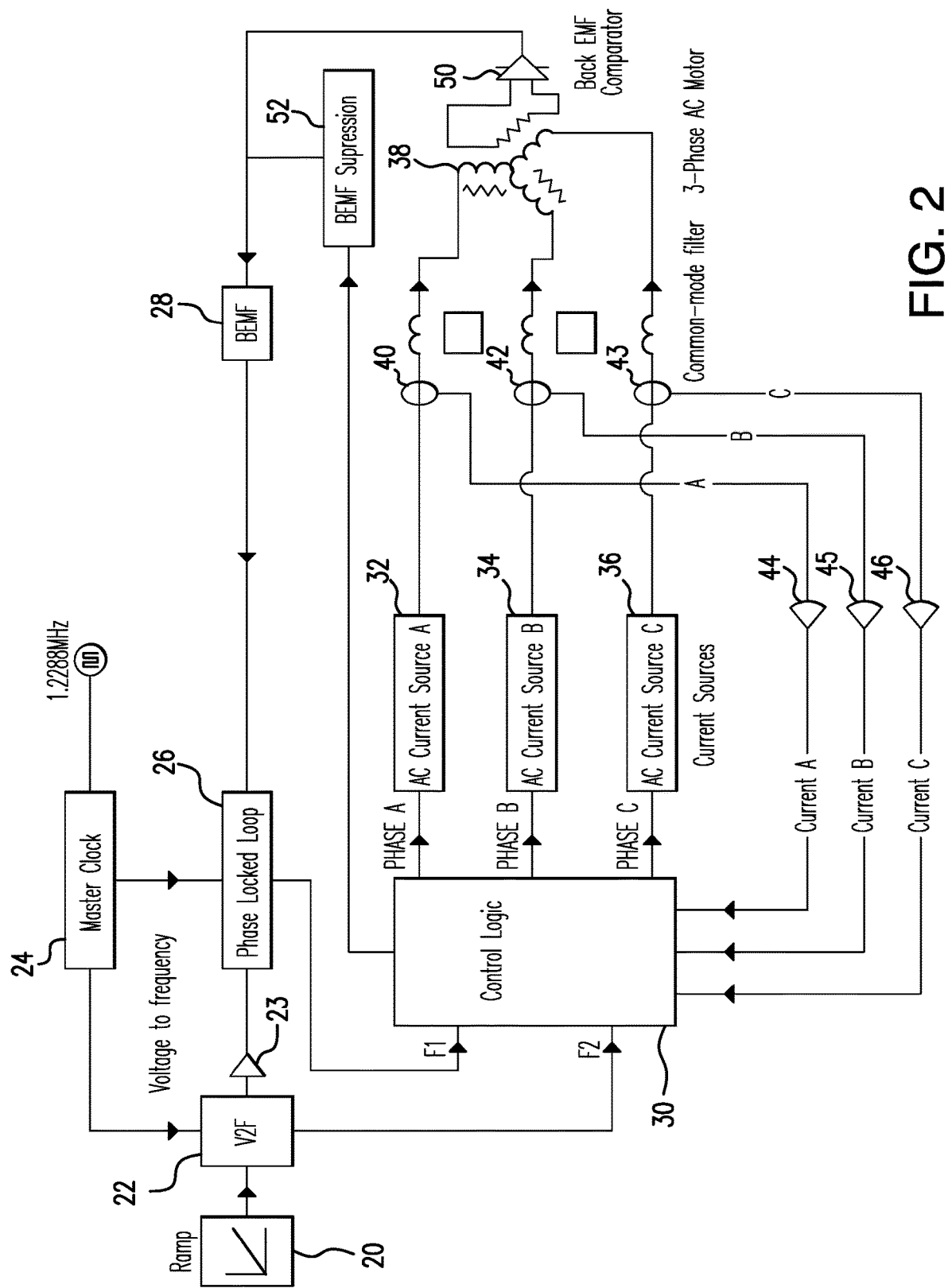
FIG. 2 illustratively depicts a high level block diagram of a current sourced motor control technology in accordance with the disclosure.

FIG. 2 shows a high-level block diagram of the current source control topology disclosed herein, for driving a 3-phase AC motor. With reference thereto, both the amplitude and frequency of the per-phase current reference are controlled by a voltage ramp generator 20, whose voltage starts at zero, and rises with a controlled slope until it reaches a maximum value. The controlled slope may start out at a low level and then increase as the 3-phase AC motor starts up and approaches its rated speed. As known in the art, the voltage ramp may be generated by an integrator circuit, by a digital to analog converter, or other means. The maximum voltage value attained by the ramp is designed to correspond to the maximum motor current (per-phase), and the maximum, or nominal base frequency. By way of example, this may be 10 A at 400 Hz.

As further shown in FIG. 2, the voltage output of the ramp generator 20 is input to a voltage to frequency converter (V2F) 22, which also is synchronized to the output of a master clock 24 to reduce jitter in its frequency output. The output of master clock 24 is also input to a phase locked loop (PLL) 26 that receives the output of the voltage to frequency converter 22 via buffer amplifier 23.

As shown in FIG. 2, a measure of the zero crossing of back EMF (BEMF) 28, developed at the output of the master current source (arbitrarily selected from one of the three AC current sources A, B, and C driving the AC motor (respectively referenced by numerals 32, 34, and 36) is provided by comparator 50 and also input to PLL 26. Accordingly, the PLL 26 provides a frequency output to Control Logic 30 whose phase is locked to the zero crossing of the BEMF. The purpose of ultimately locking the phase of the currents output from the three AC current sources 32, 34, 36 to the zero crossing of the motor's BEMF is to increase the output power factor.

For the purposes of clarity, phase-A could be arbitrarily selected as the master phase. As all three current source references are phase displaced by 120 degrees, using a single BEMF master phase, and specifying the corresponding master phase current source, ensures that the current per-phase is correctly phase locked to the BEMF.

From an incremental control standpoint, the motor BEMF is phase shifted from the applied voltage due to the phase impedance. When the master phase current is incrementally phase adjusted relative to the master BEMF using PLL control, this implies that the real power transfer to the motor, i.e., the power factor, has been maximized. (The reactive power is due to the non-zero power factor angle resulting from the phase impedance.)

Optionally, in order to reduce the magnitude of the BEMF that is applied to the PLL 26, a back EMF suppression network 52 may be added across each phase of the multi-phase windings to absorb much of the motor's BEMF.

With further reference to FIG. 2, Control Logic 30, in response to receiving inputs from the phase locked loop 26, and the V2F 22, generates three sinusoidal voltage references (each phase shifted 120° degrees with respect to each other) that drive respective AC current sources 32, 34, and 36 in accordance with the frequency output from the V2F 22 to energize the respective stator windings 38 of the 3 phase AC motor. As shown, common mode filter 401 is provided between the outputs of the AC current sources and the stator windings 38 to provide high impedance rejection of external common mode conducted emissions, thereby protecting the controller. As further shown, respective current loops 40, 42, 43 on the outputs of AC current sources 32, 34, 36 provide feedback signals to Control Logic 30 via respective buffers 44, 45, and 46. These feedback signals are used by Control Logic 30 to confirm that the frequency of the three sinusoidal voltage references at the inputs to AC current sources 32, 34, 36 signal is correct and that the sum of the three phase currents is zero, thereby ensuring that a balanced drive is provided to the 3-phase motor, wherein all three phases are being driven equally.

As discussed further below with regard to FIG. 4, and for the exemplary embodiment where the motor is an AC induction motor (ACIM), the currents within each phase of the multi-phase windings may also be monitored by way of such feedback signals and used for Slip Control purposes, as in the case of a conventional scalar control structure under V/F control. Thus, if the measured RMS motor current starts to increase beyond the maximum nominal current due to an increase in load torque, and the motor RPM is subsequently reduced below the nominal base frequency, the Control Logic 30 will provide slip compensation, as known in the art of AC induction motors, to correct the imbalance by adjusting the slip frequency. As is also understood in the art of AC motors, slip control is not needed or relevant when controlling synchronous AC motors.

In particular, under these circumstances, slip compensation will adjust the operating trajectory so that the magnitudes of the current and frequency supplied to the AC motor are both increased, thereby incrementally increasing the motor RPM back to the maximum nominal range. At this point, the motor current for each phase of the multi-phase windings will eventually fall within the normal operating range, and the motor RPM will reflect the relationship of current excitation frequency, and the number of motor poles. This slip compensation mechanism is always in place and maintains motor slip under conditions of load uncertainty.

As should be evident from the foregoing discussion of FIG. 2, one objective of the Control Logic 30 is to maintain phase alignment between the sinusoidal current applied to the master-phase winding of the multi-phase windings, and the master back EMF. This is achieved by using the PLL 26 to synchronize the phase of sinusoidal voltage reference used to control the sinusoidal current, to the zero-crossing of the back EMF. Phase alignment of the current relative to the BEMF voltage will drive a higher power factor. In this regard, it should be mentioned that this motor controller operates as a Scalar controller where, in conventional terms, the ratio of both applied voltage V and frequency F is maintained.

This V/F ratio (e.g., 115VAC/400 Hz=0.287), will maintain constant torque as the motor is soft started and voltage ramp controlled up to its base operating frequency. Because the process of current injection is not based on the integral volt-seconds applied to the motor inductance through PWM, the controller disclosed herein exhibits a much faster dynamic response than conventional controllers, because the current can be magnitude and frequency adjusted much more quickly than a regular VSI drive. This drives increased bandwidth when managing fast load changes.

Since the motor current is directly injected as a sinusoidal current per-phase, there is a need to maintain the relationship for V/F in order to maintain constant torque over the full frequency range, and up to the base frequency. This implies that the current must be both amplitude and frequency controlled at each of the per-phase current sources. The controller disclosed herein is also able to perform field weakening by increasing the frequency of motor current beyond the base frequency, and within a constant power mode of operation.

A more detailed architectural summary, showing further details of Control Logic 30, is provided in FIG. 4 and discussed further below, it being understood that in various embodiments, the current sourced architectures disclosed herein may either be implemented by discrete electronic circuit blocks or components (i.e. no software or firmware) or alternatively by including software or firmware to reduce hardware complexity, using microcontrollers, microprocessors, and the like.

Figure 4:
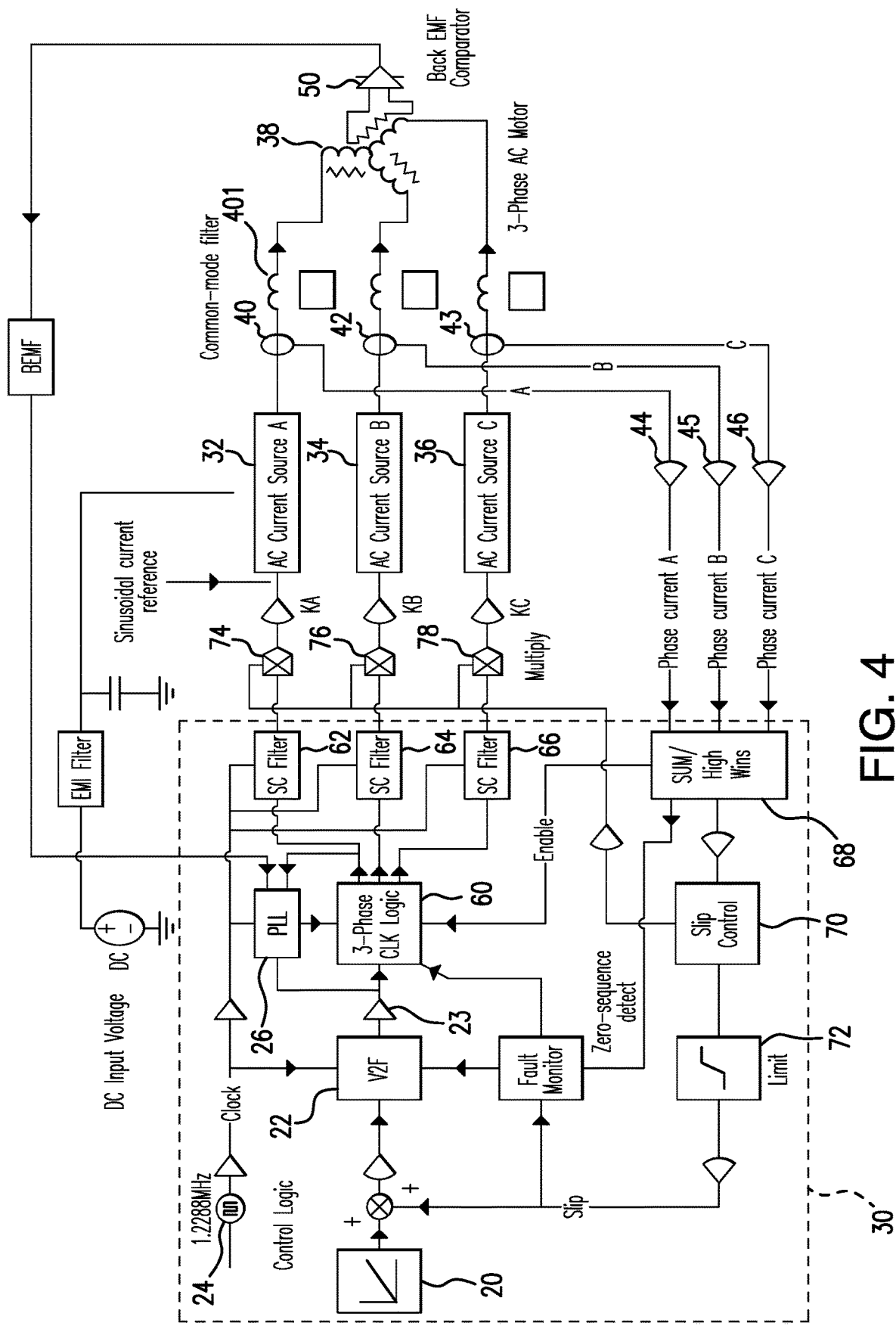
FIG. 4 illustrates a more detailed architectural diagram of an embodiment in accordance with this disclosure

With reference to FIG. 4, the same reference numerals as used in FIG. 2 are reused in FIG. 4 to designate like components. Further, for ease of illustration, the V2F converter 22 and the PLL 26 are schematically shown to be within the block labeled 30 in FIG. 4, which corresponds to Control Logic 30 of FIG. 2 The key components and functions of this Control Logic block 30 are further detailed in FIG. 4 and described below.

A. Synchronous Phase Shifted Sinusoidal Voltage Generation

From a current source control perspective, the current controller requires three sinusoidal voltage references that can provide both variable amplitude and frequency. In the case of a 3-phase AC motor, the phase displacement of these voltage references relative to each other has to be 120 degrees. In the FIG. 4 embodiment, these three phase shifted voltage references are generated in the 3-phase clock (CLK) logic block 60 by a phase delay clock generator, which in an exemplary embodiment, may use the circuitry shown in FIG. 5.

Figure 5:
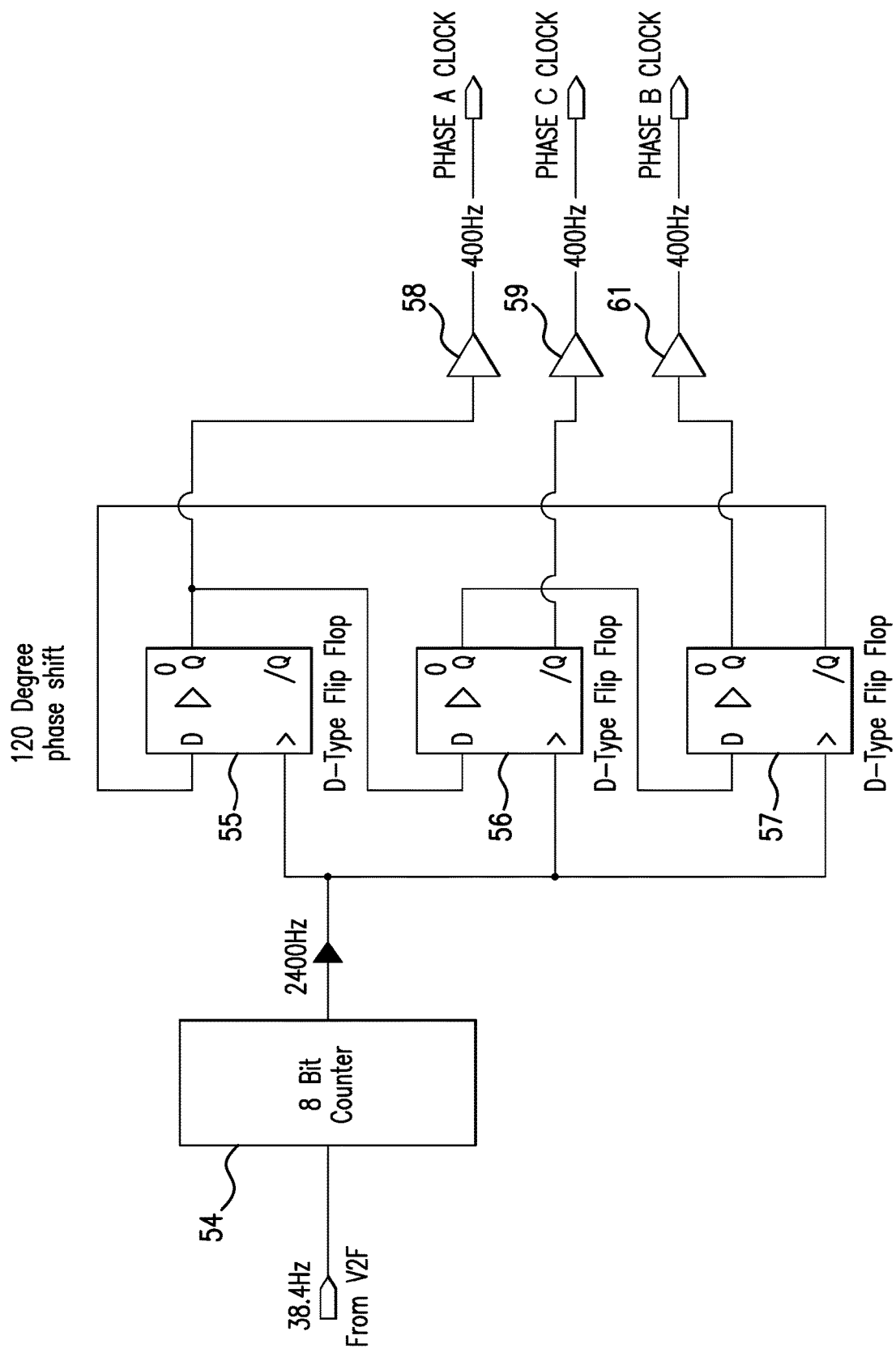
FIG. 5 illustrates exemplary 120 degree phase shift clock logic for use in accordance with an embodiment of this disclosure.

With reference to FIG. 5, this circuitry receives the frequency output from the voltage to frequency converter 22 (see FIG. 4), which may be divided down by a ratio (n) to provide a frequency at the output of binary counter 54 that is six times the maximum excitation frequency of the AC motor. As an example, for a 400 Hz motor, this would be 2400 Hz. By incorporating three D-flip-flops 55, 56, 57 using synchronous clocks and cascade Q to D ripple through inputs, the FIG. 5 circuit is able to further divide this frequency by six, thereby providing three 120 degree phase shifted clocks at a maximum frequency of 400 Hz at the respective outputs of buffers 58, 59, and 61. As shown in FIG. 4, these outputs from the 3-phase CLK logic block 60 are applied to respective switched capacitor filters 62, 64, and 66, which generate the required sinusoidal waveforms.

Figure 6:
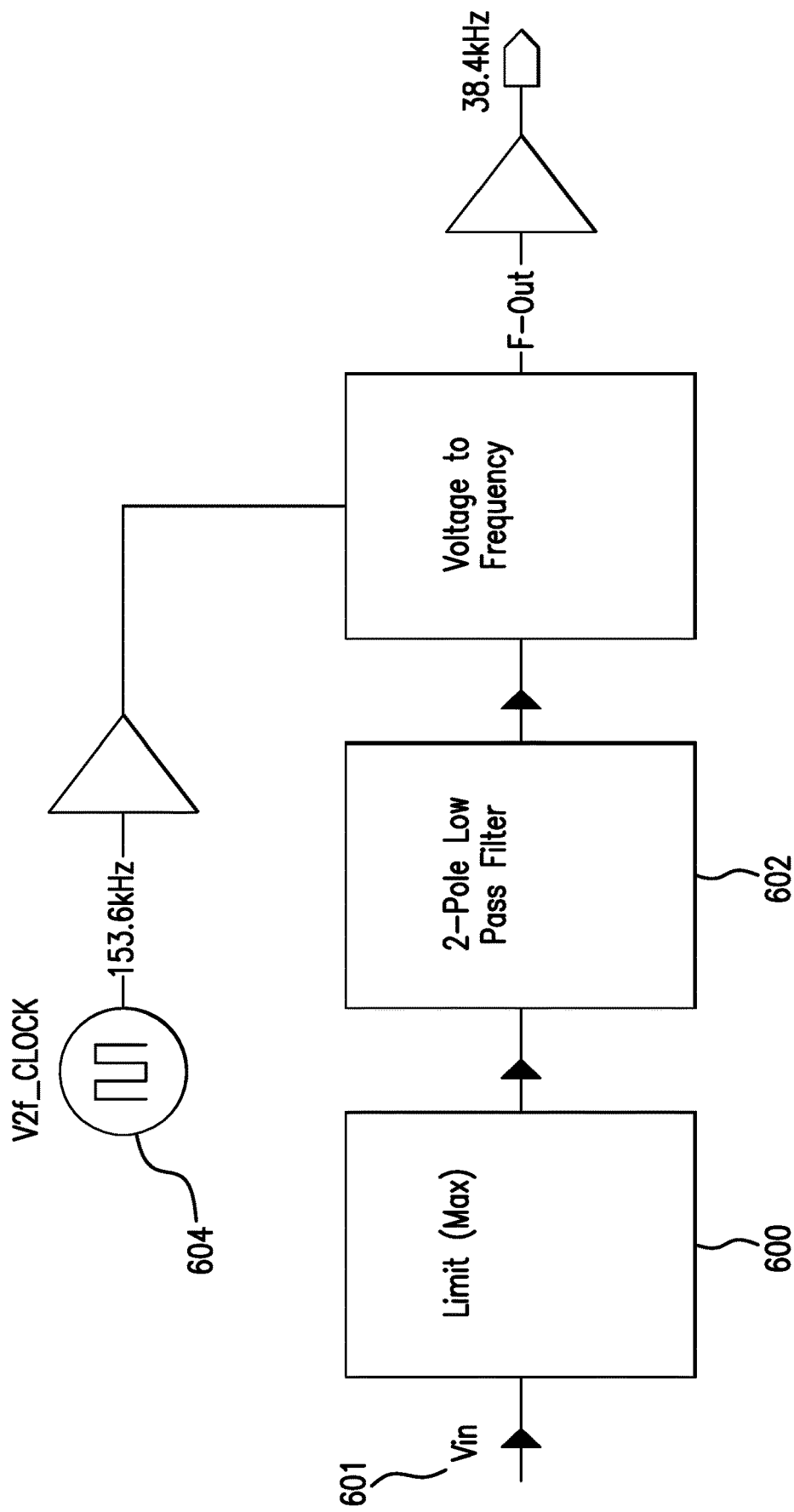
FIG. 6 illustrates an exemplary voltage to frequency converter for use in accordance with an embodiment of this disclosure.

In this regard, the voltage to frequency converter V2F 22, whose variable frequency output is applied to the input of the 3-phase CLK logic block 60, may incorporate a synchronous clock to minimize jitter. Circuitry that may be used for an exemplary voltage to frequency converter is shown in FIG. 6. Briefly, as shown in FIG. 6, the voltage ramp input 601 used for frequency conversion is constrained using an amplitude limit 600. This ensures the output frequency of the V2F is bounded to the upper frequency of the motor (e.g. 400 Hz). The ramp is then band limited using a 2-pole active low-pass filter 602, e.g. a Bessel filter with a Q-factor of 0.577. The input filtering along with the synchronous clock 604 provide the V2F 22 with a jitter free output frequency.

Referring again to the FIG. 4 block diagram, the application of an 8-bit binary count (from zero (0x00) to 8-bits (0xFF)) to a digital to analog converter (DAC) may be used to create the voltage ramp output from block 20 to drive the V2F 22. The ramp voltage output from block 20 is used by the downstream circuitry of FIG. 4 to provide two different ramp rates.

In particular, as shown in FIG. 4, a first ramp is directly applied to control the voltage to frequency converter 22, and the resulting frequency is used to control the output frequency of the current source voltage references that are generated by the 3-phase CLK Logic 60, and ultimately the frequency at the respective outputs of SC filters 62, 64, and 66.

Figure 8:
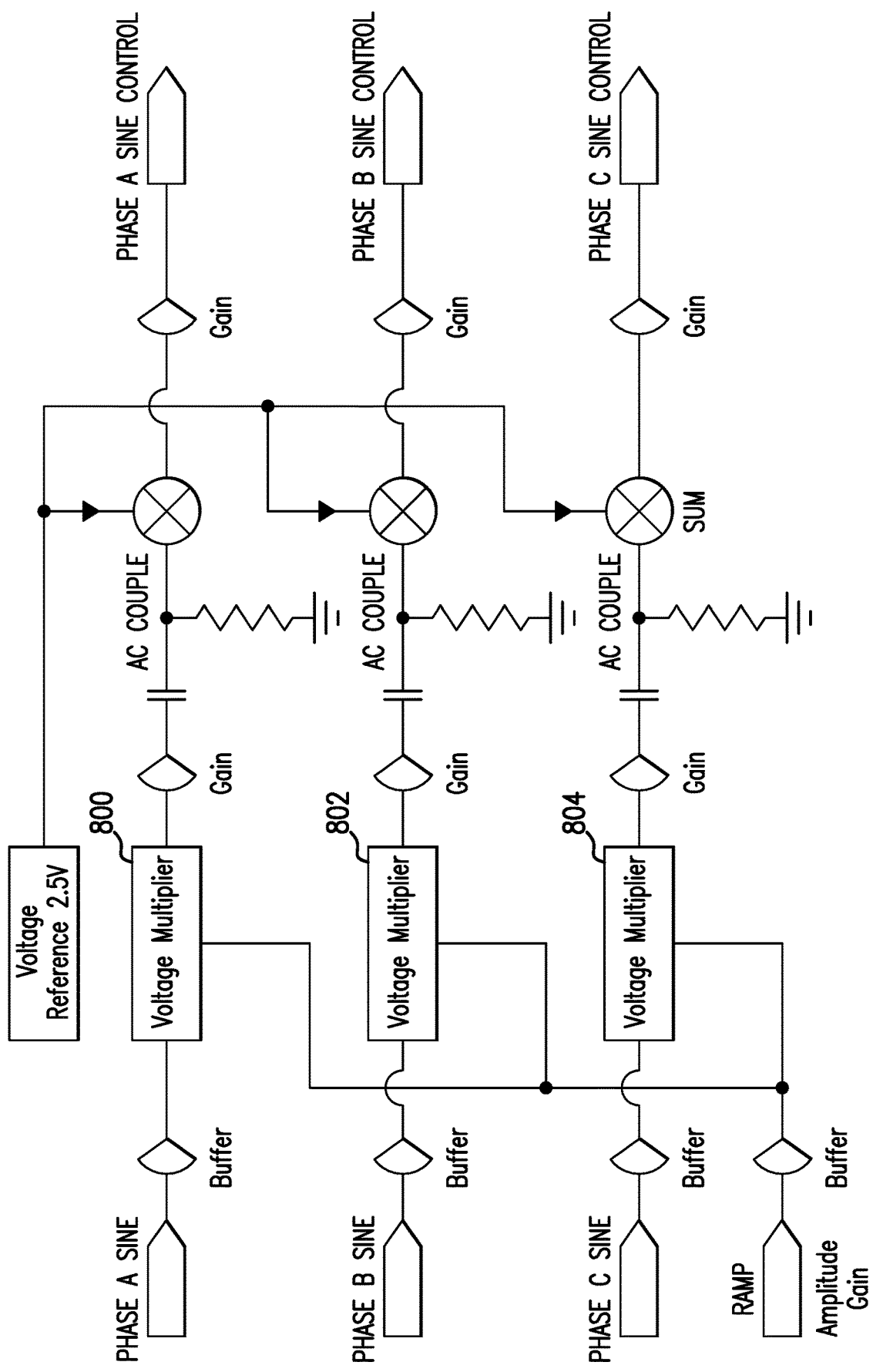
FIG. 8 illustrates an exemplary circuit for generating a variable amplitude sinusoidal voltage using analog multipliers, for use in accordance with an embodiment of this disclosure.

Next, a second ramp having a different ramp rate is derived from the first ramp, and used to control the amplitude of the current source voltage reference output from the SC filters 62, 64, 66. Such amplitude control may be accomplished by using a voltage multiplier circuit as shown in FIG. 8, which receives the outputs from the SC filters 62, 64, 66 and provides amplitude control of the 3-phase sinusoidal voltage references. This is achieved by multiplying the outputs of the SC filters 62, 64, 66 with the second ramp using respective voltage multipliers 800, 802, 804 in order to linearly increase the gain of the sinusoidal voltage references. As evident, the two ramps are scaled accordingly and have different slopes to perform their particular circuit functions.

Reverting back to FIG. 4, generation of the sinusoidal current source voltage references that are applied to the respective inputs of AC current sources 32, 34, and 36 that feed each of the multi-phase windings may be achieved as follows: The voltage to frequency (V2F) converter 22 provides a variable frequency, phase shifted square wave clock signal per-phase, which are synchronous to a higher frequency clock, and which are respectively output from the 3-phase CLK Logic 60.

Figure 7:
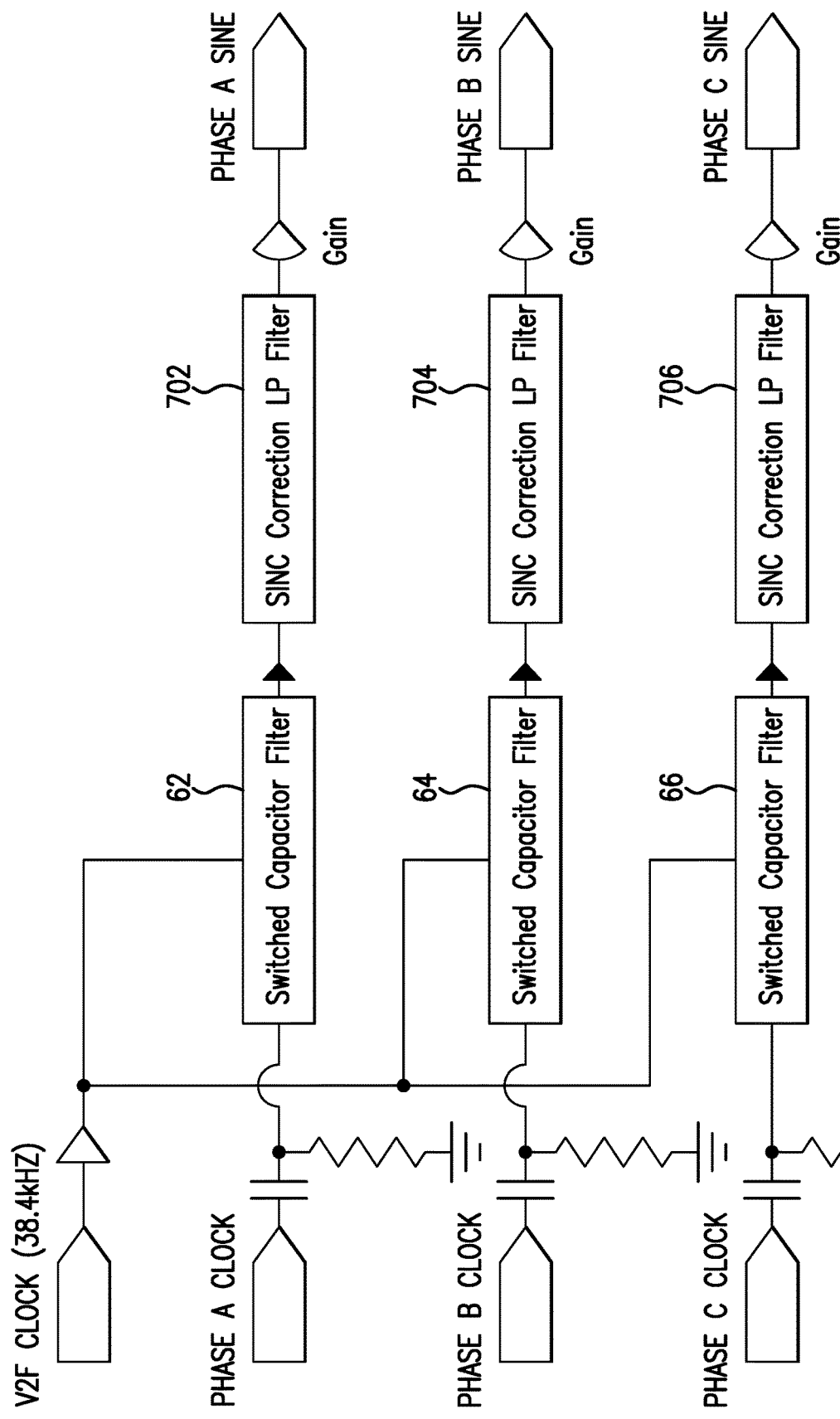
FIG. 7 illustrates an exemplary circuit embodiment for a variable frequency sinusoidal voltage generation circuit that uses switched capacitor filters, for use in accordance with an embodiment of this disclosure.

As shown in FIG. 4 and in the more detailed circuit of FIG. 7, in an embodiment these three per-phase square wave signals are subsequently applied to respective 10$^{th}$ order elliptical switched capacitor filters (SC filters 62, 64, 66) having a variable corner frequency. (The ratio of the corner frequency to fundamental sinusoidal frequency output from the 3 phase CLK logic 60 may be set to 96). To eliminate clock frequency feedthrough, the outputs of the SC filters 62, 64, 66 are passed to low-pass analog SINC correction filters 702, 704, 706. These SINC correction low pass filters attenuate the high harmonics in the square wave SC filter clock to levels where they may be ignored, thereby producing phase shifted sinusoidal waveforms at their respective outputs. This attenuation is typically −60 dB at the clock frequency. For a 400 Hz motor frequency, this would be a clock frequency of 38.4 kHz, for the purposes of clarity. Since both the fundamental and corner frequency clocks are synchronous, and change as a function of the ramp reference, the SINC correction LP filters 702, 704, and 706 will produce tracking sinusoidal outputs that are variable in frequency (e.g., from 0 to 400 Hz fundamental) to drive the AC motor). This is due to the fact that the input frequency to the SC filters is also the same as the corner frequency of the filters as they track the range in frequency. As the square wave from the 3-phase CLK logic 60 is presented to the SC filters 62, 64 and 66 and then to the SINC correction LP filters 702, 704, and 706, the higher order harmonics are attenuated, leaving only the appropriately phase shifted sinusoidal fundamental to be output from respective filters 702, 704, and 706.

B. Input Voltage Monitoring and Validation

In accordance with this disclosure, another function of the Control Logic 30 is to monitor and validate the DC voltages that power each of the per-phase AC current sources. If these voltages fall outside of predetermined limits, the monitor will either inhibit motor operation, or initiate a power down soft stop process, should the motor be running. This function can be implemented by a comparator that monitors the DC input voltage used to power the AC current source with an input deglitch filter.

C. Per-Phase Synchronous Current Sourced Converters

As previously described, each of the per-phase current sources may be configured, for example, as a linear regulator, or as a synchronous current sourced down converter (i.e., a Buck Converter) or comparable AC current source. For AC induction motor applications such as three phase cooling fans, a linear current source may be used due to the relatively low phase currents and simplicity of the circuit function. Since a current sourced down converter uses pulse width modulation for the purposes of control, it would generally be more efficient than a linear regulator in the case of motors requiring higher current operation.

In accordance with this disclosure, the control goal in all cases is to provide a sinusoidal current per-phase to each of the stator windings. The current converters also must be capable of sourcing the full rated sinusoidal phase current, and this is based on the control goals of torque (current) and frequency. While this disclosure describes exemplary embodiments that use linear current sources as well as current sourced down converters (Buck Converters), AC current sources having suitable characteristics that are based on other circuit topologies may alternatively be used as the synchronous current sources disclosed herein and are intended to be covered by the scope of this disclosure.

D. Phase Current Feedback

As shown in FIG. 4, a current transformer (e.g., current loops 40, 42, and 43) is connected to the output of each of the per-phase synchronous current source regulators. These are used to create a voltage analog of phase current for current feedback control purposes. Being a sinusoidal current sourced drive, the line frequency of current is typically in the hundreds of hertz. Therefore, with scalar V/F control, instantaneous detection and correction of current is not necessary, and an RMS detection method is satisfactory.

E. Phase Current RMS Validation and Slip Compensation

Each of the per-phase sinusoidal currents is used within a closed loop control structure so that the stator per-phase current meets the commanded current. The highest of the three phase currents, as monitored by current loops 40, 42, 43, is converted to an RMS term in the SUM/High Wins block 68. Slip Control block 70 uses the highest of the three RMS currents to detect motor drag, or other situations where the load torque is higher than normal (resulting in motor RPM that is lower than normal operation). Motor RPM may be detected using either an inductive pickup within the motor, or by measuring the back EMF voltage. In this situation, Slip Control block 70 provides a signal that is fed back to the input of the AC current sources via multipliers 74, 76 and 78, and to the V2F 22. This feedback causes the per-phase current sources to provide a small increase in excitation frequency and output current to compensate for the increased load torque and bring the motor back to normal operating conditions.

In particular, as the excitation frequency is increased, the motor RPM is also incrementally increased, and the slip term between electrical frequency and rotor RPM will reduce to a level where a nominal slip of 2-3% is in place and the motor current is once again within normal limits. Once the high loading effects on the motor have ceased, the slip compensator incrementally reduces the applied electrical frequency to each of the per-phase stator windings so that the motor is operating at the correct base frequency and within normal RPM limits. This mode of slip control is a low bandwidth compensator and operates in such a way so as not to introduce sudden transient changes in RPM. Slip control adjustment is carried out with maximum limits imposed on both frequency and current imposed by Limit block 72.

Control Logic 30 also uses the measured AC current of each phase to compensate for phase current imbalance and to ensure that each phase is being driven equally. This is achieved by the summation of all three phases within the SUM/High Wins block 68. A summation close to zero, as may be detected by a window comparator, declares a balanced current drive. This implies that the phase sum of all three phases should be equal to zero.

F. Motor Tachometer Feedback

Motor RPM may be determined by tracking the back EMF voltage, or by using a hall sensor as a tachometer. This information is used to provide information to the centralized controller so that the slip compensator is able to scale the correct trajectory of compensation in both current and frequency based on the motor applied electrical frequency, and actual motor RPM.

G. Motor Position Synchronization Using PLL for Optimal Power Factor

It is important to ensure that the motor BEMF is phase aligned (i.e., in phase) with the sourced current so that the power factor may be optimized by the Control Logic 30. This is achieved by synchronous control of the current sources relative to the per-phase BEMF, and using the phase locked loop 26 to incrementally phase align the motor BEMF to phase current.

H. Variable Frequency, Variable Voltage Sinusoidal Current Command.

The Control Logic 30 generates a voltage analog of current command, which is amplitude and frequency variable. The current command to each of the AC current sources is the output of the V2F 22 and the sine voltage regulation scheme. This is also augmented by the slip controller, which adjusts the current to the motor, as needed. All three commands per-phase are phase shifted by 120 degrees. This is important when one considers starting high inertial loads and in reacting to fast changes in load torque.

I. Phase Locked Loop (PLL)

As discussed herein, the phase locked loop 26 is used to phase-lock the BEMF with the phase of the master current control reference. This ensures that the motor current frequency per-phase is aligned to the BEMF. As each of the per-phase current references (sine voltages) is synchronously phase shifted, using a dedicated phase to lock the PLL ensures that all phases are aligned with respect to their own BEMF relative to applied phase current.

As disclosed herein, the current sourced controller topology performs voltage-frequency control, slip control, and torque control of the AC motor. The specific implementation of such controller may be achieved either incorporating a digital signal processor (DSP), or by implementing using a discrete analog and/or digital solution.

The following significant advantages can be obtained by using the novel current sourced controller architectures disclosed herein, as compared to conventional, prior art VSI topologies:

Significantly, the current sourced approach disclosed herein results in elimination of the VSI and high voltage DC bus required to provide a high link voltage to the VSI. Therefore, the DC link voltage per current source only needs to be sized to stand (i.e., source) the maximum current required for full torque versus frequency.

Due to the elimination of the VSI, there is no need to employ pulse width modulation of the pole voltage. This eliminates complex PWM control logic any need for sinusoidal output filters.

Because the current sourced control disclosed herein is centered on controlling current, it is possible to drive fast changes in current and frequency, which can be used to manage load uncertainty and increase torque.

Since the topology disclosed herein is based on a current sourced motor drive, it provides a superior design for so-called "long line" motor and controller applications where there is significant wire length between the motor and controller. In particular, the current source controller is long-line capable and may be used without the EMI issues that arise with standard VSI topologies using switch node modulation of voltage.

Another advantage is that this type of controller may also be used for controlling single phase AC motors, by using a single phase section and a controller having reduced complexity.

Numerous applications for this current source control scheme include, but are not limited to, e.g., control of both synchronous and asynchronous three phase motors, control of single phase AC motors, pump controllers using AC induction motors, long-line AC motor applications, control of PMAC motors, and three phase AC fans and blowers, to name just a few applications.

Moreover, efficiency gains that can be achieved with the disclosed current sourced topology are likely to be significant, particularly when an optimally designed synchronously controlled down converter is used that incorporates SiC technologies.

In addition to the foregoing advantages, strategic gains for this topology include faster to market design and implementation, reduced form factor and weight, reduced system complexity, and reduced non-recurring costs.

By way of summary, the foregoing disclosure has described embodiments of controls for a three phase motor that use current sourced control topologies. Such current sourced topologies eliminate problems arising from the stand prior art VSI circuit topologies that rely on pole voltage modulation and provide controls that are EMC quiet, long line capable, and that have improved efficiencies over the prior art.

Now that exemplary embodiments of the present disclosure have been shown and described in detail, various modifications and improvements thereon will become readily apparent to those skilled in the art, all of which are intended to be covered by the following claims.

What is claimed is:

1. A controller for a multi-phase AC motor having a number of windings, said controller comprising:
    a plurality of AC current sources, a number of AC current sources equal to the number of windings, each coupled to a different winding to supply sinusoidal current thereto;
    control logic coupled to the plurality of AC current sources, said control logic generating sinusoidal voltage references of a common variable frequency at the respective inputs of each of the AC current sources that drive its connected winding with sinusoidal AC current at a specified phase and variable amplitude of the common variable frequency; and
    a voltage-to-frequency converter coupled with the control logic and receiving a variable ramp voltage as input.

2. The controller of claim 1, wherein the plurality of AC current sources comprise linear current amplifiers.

3. The controller of claim 1, wherein the control logic comprises clock logic and switched capacitor filters for generating said sinusoidal voltage references.

4. The controller of claim 3, wherein a voltage to frequency converter is connected to the input of the clock logic to generate a plurality of clock signals having different phases.

5. The controller of claim 4, wherein said clock signals are input to the switched capacitor filters to generate said sinusoidal voltage references.

6. The controller of claim 1, further including a phase lock loop to lock the phase of induced voltage generated by the AC motor to the phase of the sinusoidal AC current output from one of the plurality of AC current sources.

7. A controller for a three-phase AC induction motor having three stator windings, said controller comprising:
    three AC current sources, each coupled to a different one of said stator windings to supply sinusoidal current thereto;
    control logic coupled to the three AC current sources, said control logic generating sinusoidal voltage references of a common variable frequency that are coupled to the respective inputs of each AC current source, thereby controlling each AC current source to drive its coupled winding with sinusoidal AC current at a specified phase and variable amplitude of the common variable frequency; and
    a voltage-to-frequency converter coupled with the control logic and receiving a variable ramp voltage as input.

8. The controller of claim 7, wherein the AC current sources comprise linear current amplifiers.

9. The controller of claim 7, wherein the control logic comprises clock logic and switched capacitor filters for generating said sinusoidal voltage reference.

10. The controller of claim 9, wherein a voltage to frequency converter is coupled to the input of the clock logic to generate a plurality of clock signals having phases that are shifted 120 degrees relative to each other.

11. The controller of claim 10, wherein said phase shifted clock signals are input to the switched capacitor filters to generate said sinusoidal voltage references.

12. The controller of claim 10, further including a phase locked loop to lock the phase of the motor's induced voltage to the phase of the sinusoidal current output from one of the plurality of AC current sources.

13. A method for controlling a three-phase AC motor, said three phase AC motor having three windings comprising the steps of:
coupling an AC current source to each winding to supply a sinusoidal current to the winding;
generating sinusoidal voltage references at different voltage levels and phases; and
coupling said sinusoidal voltage references to each of said AC current sources to drive each of the current sources to output a variable current at a specific phase and at a variable frequency, so as to control the operation of the three phase motor,
wherein the sinusoidal current is supplied to each winding without pulse width modulation switching of a DC link voltage.

14. The method of claim 13, wherein the step of coupling an AC current source further comprises coupling a linear current amplifier.

15. The method of claim 13, wherein the generating step further comprises using clock logic and switched capacitor filters to generate the sinusoidal voltage references.

16. The method of claim 15, wherein the generating step further comprises using a voltage to frequency converter to generate clocks with different phases from the clock logic.

17. The method of claim 13, wherein an induced voltage generated by the three-phase motor is phase locked to one of the currents output from the current sources.

* * * * *